US012562315B2

(12) United States Patent
Masuda

(10) Patent No.: US 12,562,315 B2
(45) Date of Patent: *\*Feb. 24, 2026

(54) CERAMIC ELECTRONIC DEVICE INCLUDING A MULTILAYER STRUCTURE WITH INTERNAL ELECTRODE LAYERS HAVING CERTAIN Sn CONCENTRATION

(71) Applicant: TAIYO YUDEN CO., LTD., Tokyo (JP)

(72) Inventor: Hidetoshi Masuda, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/980,465

(22) Filed: Dec. 13, 2024

(65) Prior Publication Data

US 2025/0111996 A1     Apr. 3, 2025

Related U.S. Application Data

(63) Continuation of application No. 18/593,625, filed on Mar. 1, 2024, now Pat. No. 12,211,653, which is a
(Continued)

(30) Foreign Application Priority Data

Jan. 27, 2021    (JP) ................................. 2021-010854

(51) Int. Cl.
*H01G 4/30*          (2006.01)
*C04B 35/468*          (2006.01)
(Continued)

(52) U.S. Cl.
CPC ........... *H01G 4/30* (2013.01); *C04B 35/4682* (2013.01); *C04B 35/64* (2013.01); *H01G 4/008* (2013.01); *H01G 4/012* (2013.01); *H01G 4/1218* (2013.01)

(58) Field of Classification Search
CPC ...... H01G 4/008; H01G 4/012; H01G 4/1218; H01G 4/30; C04B 35/4682; C04B 35/64
See application file for complete search history.

(56) References Cited

U.S. PATENT DOCUMENTS 11,948,751 B2 *   4/2024   Masuda .................. B32B 18/00
12,211,653 B2 *   1/2025   Masuda ............... H01G 4/1218
(Continued)

FOREIGN PATENT DOCUMENTS

JP          2007258646 A       10/2007
JP          2018117051 A       7/2018
WO          2014024538 A1       2/2014

OTHER PUBLICATIONS

A Notice of Reasons for Refusal issued by the Japanese Patent Office, mailed May 14, 2024, for Japanese counterpart application No. 2021-010854. (5 pages).
(Continued)

*Primary Examiner* — Nathan Milakovich
(74) *Attorney, Agent, or Firm* — Pillsbury Winthrop Shaw Pittman, LLP

(57)          ABSTRACT

A ceramic electronic device includes a multilayer structure in which each of a plurality of dielectric layers of which a main component is ceramic and each of three or more of internal electrode layers are alternately stacked. The three or more of internal electrode layers include Ni and Sn, wherein Sn is distributed entirely in the three or more of internal electrode layers. An internal electrode layer having a larger Sn concentration is closer to an outermost edge in a stacking direction than an internal electrode layer having a smaller Sn concentration and being located on a center side of the stacking direction, in a relationship of at least two of the three or more of internal electrode layers.

12 Claims, 8 Drawing Sheets

Related U.S. Application Data continuation of application No. 17/571,383, filed on Jan. 7, 2022, now Pat. No. 11,948,751.

(51) Int. Cl.
| | |
|---|---|
| *C04B 35/64* | (2006.01) |
| *H01G 4/008* | (2006.01) |
| *H01G 4/012* | (2006.01) |
| *H01G 4/12* | (2006.01) |

(56) References Cited

U.S. PATENT DOCUMENTS

| | | |
|---|---|---|
| 2007/0223177 A1 | 9/2007 | Ito et al. |
| 2015/0155098 A1 | 6/2015 | Yamaguchi et al. |
| 2016/0358713 A1 | 12/2016 | Doi et al. |
| 2018/0204678 A1 | 7/2018 | Yamaguchi |

OTHER PUBLICATIONS

Non-Final Office Action issued by U.S. Patent and Trademark Office, dated Oct. 6, 2023, for U.S. related U.S. Appl. No. 17/571,383 (13 pages).
Notice of Allowance issued by U.S. Patent and Trademark Office, dated Dec. 11, 2023, for U.S. related U.S. Appl. No. 17/571,383 (7 pages).
Notice of Allowance issued by U.S. Patent and Trademark Office, dated Sep. 26, 2024, for U.S. related U.S. Appl. No. 18/593,625 (15 pages).
Notice of Reasons for Refusal dated Jul. 22, 2025, issued in corresponding Japanese Patent Application No. 2024-113272, with English translation (10 pgs.).
Notice of Submission of Opinion dated Jul. 29, 2025, issued in corresponding Korean Patent Application No. 10-2022-0006335, with English machine translation (10 pgs.).

* cited by examiner

Sn CONCENTRATION

LARGER

SMALLER

INTERFACE BETWEEN
INTERNAL ELECTRODE LAYER
AND DIELECTRIC LAYER

INTERFACE BETWEEN
INTERNAL ELECTRODE LAYER
AND DIELECTRIC LAYER

Sn CONCENTRATION

POSITION IN THICKNESS DIRECTION

CERAMIC ELECTRONIC DEVICE INCLUDING A MULTILAYER STRUCTURE WITH INTERNAL ELECTRODE LAYERS HAVING CERTAIN Sn CONCENTRATION

CROSS-REFERENCE TO RELATED APPLICATION

This application is a continuation of U.S. patent application Ser. No. 18/593,625, filed Mar. 1, 2024, which is a continuation of U.S. patent application Ser. No. 17/571,383, filed Jan. 7, 2022, now U.S. Pat. No. 11,948,751, issued Apr. 2, 2024, which is based upon and claims the benefit of priority of the prior Japanese Patent Application No. 2021-010854, filed on Jan. 27, 2021, each entire disclosure of which is herein incorporated by reference. The applicant herein explicitly rescinds and retracts any prior disclaimers or disavowals or any amendment/statement otherwise limiting claim scope made in any parent, child or related prosecution history with regard to any subject matter supported by the present application.

FIELD

A certain aspect of the present invention relates to a ceramic electronic device and a manufacturing method of the ceramic electronic device.

BACKGROUND

Electronic devices are being downsized. Therefore, downsizing of ceramic electronic devices such as multilayer ceramic capacitors mounted on the electronic devices is requested. As methods for enlarging capacity which is a basic characteristic, there are three methods of (1) enlarging a dielectric constant of dielectric layers, (2) enlarging an area for regulating the capacity, and (3) reducing the thickness of the dielectric layers. In a case where the dielectric constant and the device size are determined, when the dielectric layers are thin, the capacity per a single dielectric layer becomes larger. In this case, when the dielectric layers and the internal electrode layers are thin, the number of stacked layers per a thickness unit becomes larger. Therefore, the structure has an advantage.

SUMMARY OF THE INVENTION

However, when the internal electrode layers are thin, the internal electrode layers may be easily broken in a firing process. When a water component intrudes into the broken portion from external environment and reaches an active section, insulation failure or the like may occur. When the dielectric layers are thin, the insulation failure or the like may be accelerated. Japanese Patent Application Publication No. 2007-258646 discloses a method in which the breaking of the internal electrode layers is suppressed by adjusting a ratio of nickel (Ni) paste and a co-material for forming the internal electrode layers and adjusting a particle size of the Ni paste and the co-material. In the method, an internal electrode having resistance to the breaking is located at an outermost layer in a stacking direction. Thus, intrusion of moisture from external environment is suppressed. And the resistance to humidity is improved. However, when the internal electrode layers are thin, sufficient effect is not achieved. Therefore, other methods are requested.

Accordingly, it is thought that tin (Sn) is added to the internal electrode layers. When Sn is added to the internal electrode layers, resistance to humidity is improved. However, in this case, ESR (Equivalent Series Resistance) becomes larger.

According to an aspect of the present invention, there is provided a ceramic electronic device including: a multilayer structure in which each of a plurality of dielectric layers of which a main component is ceramic and each of three or more of internal electrode layers are alternately stacked, wherein the three or more of internal electrode layers include Ni and Sn, wherein an internal electrode layer having a larger Sn concentration is closer to an outermost edge in a stacking direction than an internal electrode layer having a smaller Sn concentration and being located on a center side of the stacking direction, in a relationship of at least two of the three or more of internal electrode layers.

According to another aspect of the present invention, there is provided a manufacturing method of a ceramic electronic device including: forming stack units by forming each of internal electrode patterns including Ni and Sn, on each of dielectric green sheets; forming a multilayer structure by stacking three or more of the stack units; firing the multilayer structure, wherein an internal electrode pattern having a larger Sn concentration is closer to an outermost edge in a stacking direction than an internal electrode pattern having a smaller Sn concentration and being located on a center side of the stacking direction, in a relationship of at least two of the internal electrode patterns.

DETAILED DESCRIPTION

A description will be given of an embodiment with reference to the accompanying drawings.

Figure 1:
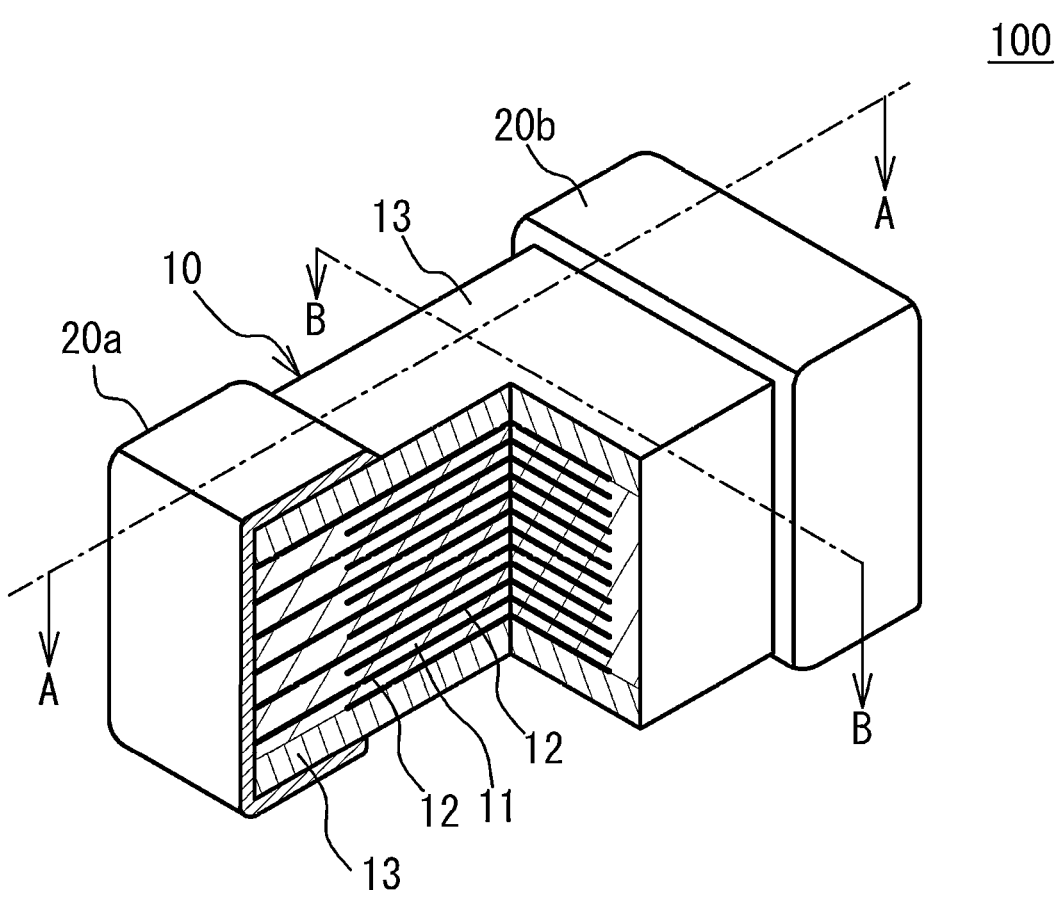
FIG. 1 illustrates a perspective view of a multilayer ceramic capacitor in which a cross section of a part of the multilayer ceramic capacitor is illustrated.
Figure 2:
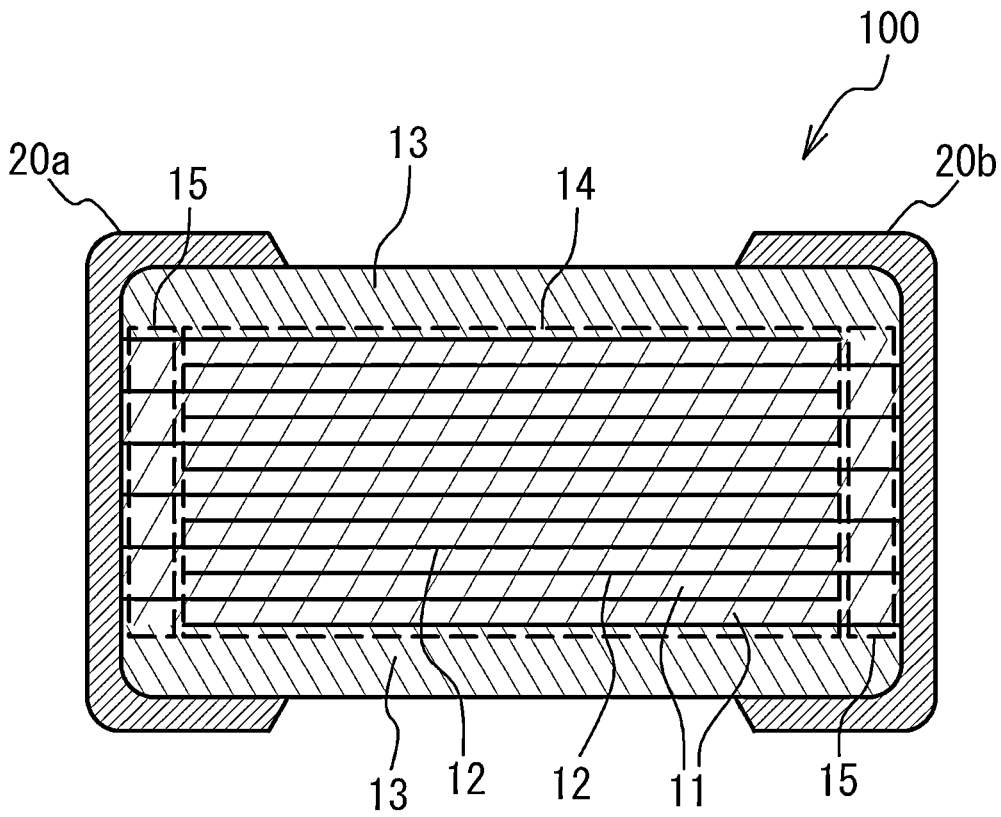
FIG. 2 illustrates a cross sectional view taken along a line A-A of FIG. 1.
Figure 3:
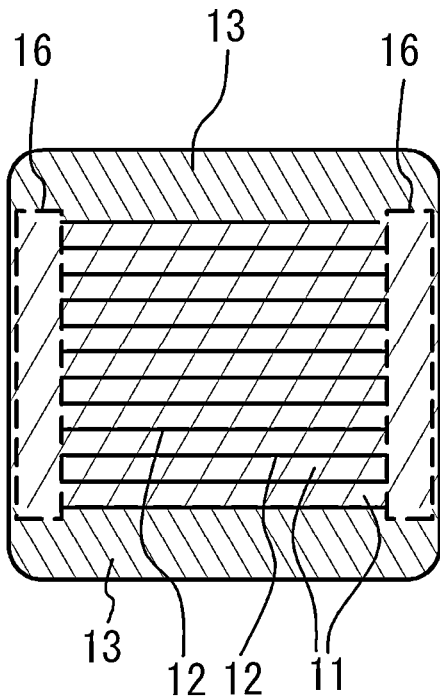
FIG. 3 illustrates a cross sectional view taken along a line B-B of FIG. 1.

(Embodiment) FIG. 1 illustrates a perspective view of a multilayer ceramic capacitor 100 in accordance with an embodiment, in which a cross section of a part of the multilayer ceramic capacitor 100 is illustrated. FIG. 2 illustrates a cross sectional view taken along a line A-A of FIG. 1. FIG. 3 illustrates a cross sectional view taken along a line B-B of FIG. 1. As illustrated in FIG. 1 to FIG. 3, the multilayer ceramic capacitor 100 includes a multilayer chip 10 having a rectangular parallelepiped shape, and a pair of external electrodes 20a and 20b that are respectively provided at two end faces of the multilayer chip 10 facing each other. In four faces other than the two end faces of the multilayer chip 10, two faces other than an upper face and a lower face of the multilayer chip 10 in a stacking direction are referred to as side faces. The external electrodes 20a and 20b extend to the upper face, the lower face and the two side faces of the multilayer chip 10. However, the external electrodes 20a and 20b are spaced from each other. In FIG. 1, an X-axis direction (first direction) is a length direction of the multilayer chip 10.

The multilayer chip 10 has a structure designed to have dielectric layers 11 and internal electrode layers 12 alternately stacked. The dielectric layer 11 includes ceramic material acting as a dielectric material. The internal electrode layers 12 include a base metal material. End edges of the internal electrode layers 12 are alternately exposed to a first end face of the multilayer chip 10 and a second end face of the multilayer chip 10 that is different from the first end face. In the embodiment, the first end face is opposite to the second end face. The external electrode 20a is provided on the first end face. The external electrode 20b is provided on the second end face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In a multilayer structure of the dielectric layers 11 and the internal electrode layers 12, two of the internal electrode layers 12 are positioned at outermost layers in a stacking direction. The upper face and the lower face of the multilayer structure that are the internal electrode layers 12 are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.25 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

The dielectric layers 11 are mainly composed of a ceramic material that is expressed by a general formula $ABO_3$ and has a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_y Ti_{1-z}Zr_zO_3$ ($0 \leq x \leq 1$, $0 \leq y \leq 1$, $0 \leq z \leq 1$) having a perovskite structure. An average thickness of each of the dielectric layers 11 may be, for example, 0.05 μm or more and 5 μm or less. The average thickness may be 0.1 μm or more and 3 μm or less. The average thickness may be 0.2 μm or more and 1 μm or less.

As illustrated in FIG. 2, a section, in which a set of the internal electrode layers 12 connected to the external electrode 20a face another set of the internal electrode layers 12 connected to the external electrode 20b, is a section generating electrical capacity in the multilayer ceramic capacitor 100. Accordingly, the section is referred to as a capacity section 14. That is, the capacity section 14 is a section in which the internal electrode layers next to each other being connected to different external electrodes face each other.

A section, in which the internal electrode layers 12 connected to the external electrode 20a face each other without sandwiching the internal electrode layer 12 connected to the external electrode 20b, is referred to as an end margin 15. A section, in which the internal electrode layers 12 connected to the external electrode 20b face each other without sandwiching the internal electrode layer 12 connected to the external electrode 20a is another end margin 15. That is, the end margin 15 is a section in which a set of the internal electrode layers 12 connected to one external electrode face each other without sandwiching the internal electrode layer 12 connected to the other external electrode. The end margins 15 are sections that do not generate electrical capacity in the multilayer ceramic capacitor 100.

As illustrated in FIG. 3, a section of the multilayer chip 10 from the two sides thereof to the internal electrode layers 12 is referred to as a side margin 16. That is, the side margin 16 is a section covering edges of the stacked internal electrode layers 12 in the extension direction toward the two side faces. The side margin 16 does not generate electrical capacity.

All of the internal electrode layers 12 include Ni and Sn. For example, a main component of all of the internal electrode layers 12 is Ni. And all of the internal electrode layers 12 include Sn. When the internal electrode layer 12 includes Ni and Sn, it is possible to improve the resistance to humidity of the multilayer ceramic capacitor 100. For example, it is thought that when Ni forms an alloy together with Sn, the condition of the interface between the internal electrode layer 12 and the dielectric layer 11 changes. In this case, it is thought that the resistance to humidity of the multilayer ceramic capacitor 100 is improved.

However, when the internal electrode layer 12 includes Sn in addition to Ni, the electrical resistance of the internal electrode layer 12 may get larger. In this case, the ESR of the whole of the multilayer ceramic capacitor 100 may get larger. Accordingly, the multilayer ceramic capacitor 100 has a structure for suppressing the ESR and improving the resistance to humidity.

The present inventors have found that water easily intrudes into a portion of the multilayer ceramic capacitor 100 which has a small distance from the external environment. The multilayer ceramic capacitor 100 of the embodiment has a structure in which the internal electrode layer 12 having a larger Sn concentration is closer to the outermost edge in the stacking direction than the internal electrode layer 12 having a smaller Sn concentration, in a relationship of at least two of the internal electrode layers 12 within a range from the center internal electrode layer 12 in the stacking direction to the outermost internal electrode layer 12 in the stacking direction. In the structure, the Sn concentration of the internal electrode layer 12 having the small distance from the external environment has the larger Sn concentration. Therefore, the effect of improving the resistance to humidity of the multilayer ceramic capacitor 100 becomes remarkable. The Sn concentration of the internal electrode layer 12 having the large distance from the external environment is small. It is therefore possible to maintain the resistance to humidity and reduce the ESR of the multilayer ceramic capacitor 100. That is, it is possible to reduce the ESR and improve the resistance to humidity of the multilayer ceramic capacitor 100. When the number of the internal electrode layers 12 is an even number, the center internal electrode layer in the stacking direction means the center two internal electrode layers in the stacking direction. When the number of the internal electrode layers 12 is an odd number, the center internal electrode layer means the single internal electrode layer in the center in the stacking direction.

Figures 4A, 4B:
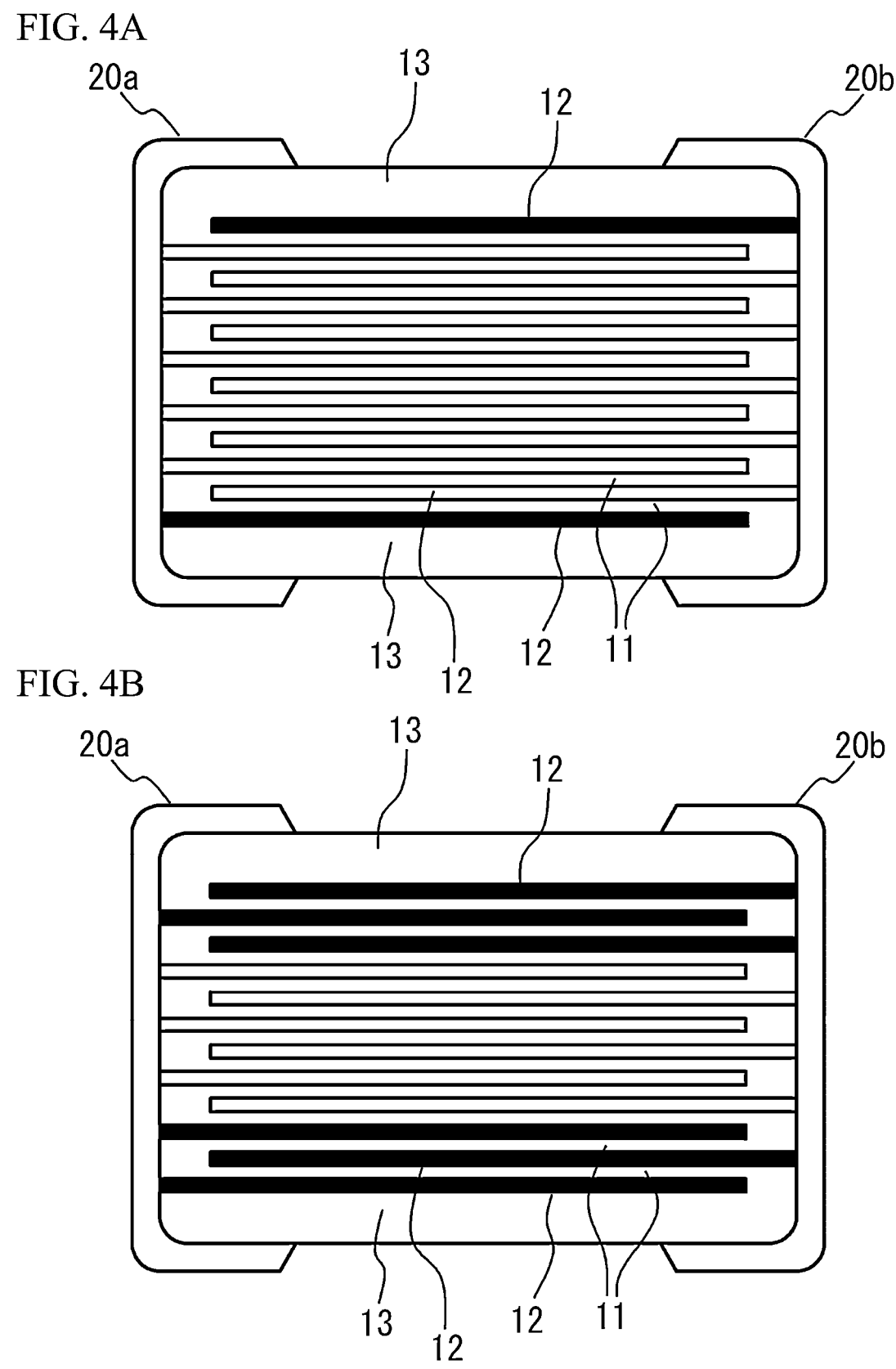
FIG. 4A and FIG. 4B illustrate a Sn concentration.

For example, as illustrated in FIG. 4A, it is preferable that the Sn concentration of the outermost internal electrode layers 12 is the highest in the ranges from the center internal electrode layer to the outermost internal electrode layers 12 in the stacking direction. In the structure, the Sn concentration of the internal electrode layers 12 having the smallest distance from the external environment is maximum. Therefore, the effect of improving the resistance to humidity of the multilayer ceramic capacitor 100 gets larger. In FIG. 4A, the outermost internal electrode layers 12 are illustrated with black. This means that the outermost internal electrode layers 12 have the highest Sn concentration.

For example, as illustrated in FIG. 4B, it is preferable that the Sn concentration of the internal electrode layers 12 (the internal electrode layers 12 in an outer layer section) in a part from the outermost edge to the center side in the stacking direction is larger than the Sn concentration of the remaining internal electrode layers 12 (the internal electrode layers in a center section) of the center side in the stacking direction. In the structure, the Sn concentration of the internal electrode layers 12 in the outer layer section having a small distance from the external environment is large. Therefore, the effect of improving the resistance to humidity of the multilayer ceramic capacitor 100 gets larger. In FIG. 4B, the internal electrode layers 12 are illustrated with white or black. This means the magnitude relation of the Sn concentration.

When the outer layer section having the larger Sn concentration is excessively narrow in the structure of FIG. 4B, the ESR is reduced but sufficient effect of improving the resistance to humidity may not be necessarily achieved. It is therefore preferable that the largeness of the outer layer section has a lower limit. For example, it is preferable that a ratio of each of the outer layer sections is more than 0% in the all internal electrode layers 12 in the stacking direction It is preferable that the ratio is 5% or more. It is more preferable that the ratio is 10% or more.

On the other hand, when the outer layer section having the larger Sn concentration is excessively wide, the sufficient resistance to humidity is achieved but the ESR may be large. It is therefore preferable that the largeness of the outer layer section has an upper limit. For example, it is preferable that a ratio of each of the outer layer sections is 45% or less in the all internal electrode layers 12 in the stacking direction It is more preferable that the ratio is 30% or less. It is still more preferable that the ratio is 20% or less.

Figure 5:
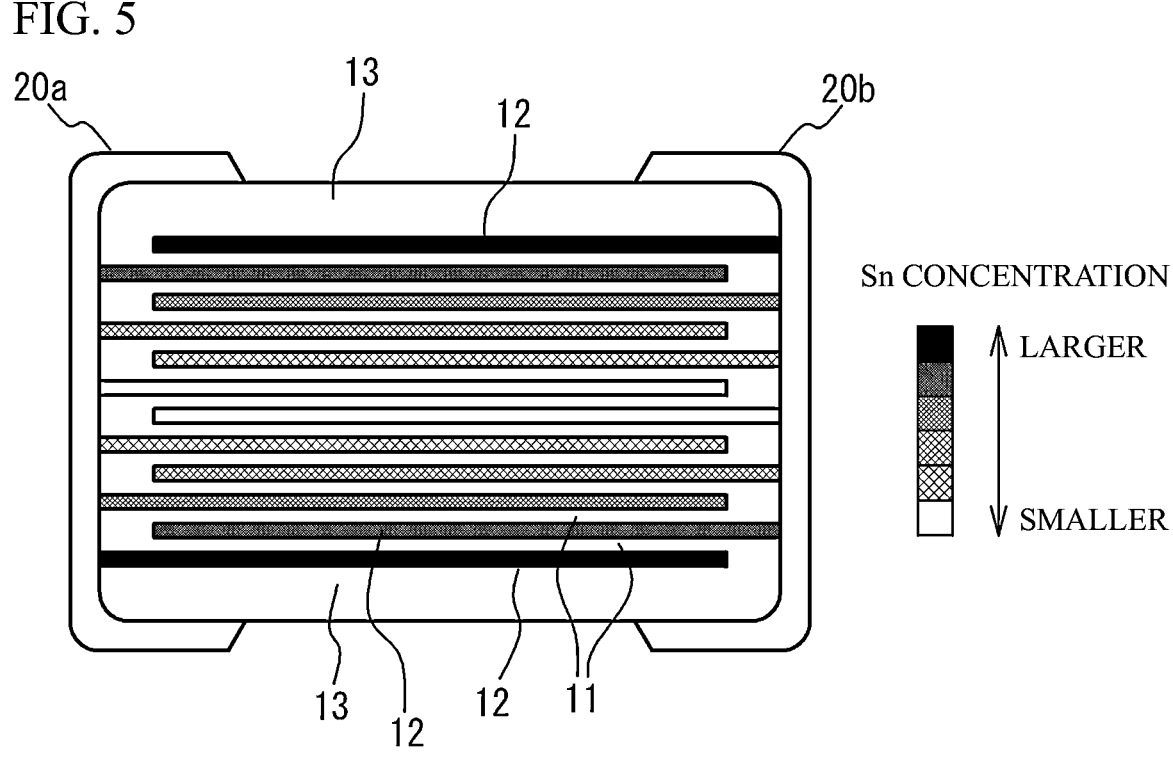
FIG. 5 illustrates a Sn concentration.

For example, as illustrated in FIG. 5, it is preferable that the Sn concentration of the internal electrode layers 12 gradually gets larger or gets larger in steps from the center internal electrode layer 12 to the outermost internal electrode layer 12 in the stacking direction. In the structure, the Sn concentration of the internal electrode layer 12 having a small distance from the external environment becomes large. Therefore, the effect of improving the resistance to humidity of the multilayer ceramic capacitor 100 becomes large. The Sn concentration of the internal electrode layer 12 having a large distance from the external environment becomes small. It is therefore possible to maintain the resistance to humidity of the multilayer ceramic capacitor 100 and reduce the ESR. When the Sn concentration gradually gets larger, the Sn concentration may continuously increase (monotonically increase). Alternatively, when the Sn concentration gradually gets larger, the Sn concentration may repeat up and down and increase as a whole if the Sn concentration is measured at a plurality of sample points from the center internal electrode layer 12 to the outermost internal electrode layer 12.

Each thickness of the internal electrode layers 12 may be 0.01 µm or more and 5 µm or less. Each thickness of the internal electrode layers 12 may be 0.05 µm or more and 3 µm or less. Each thickness of the internal electrode layers 12 may be 0.1 µm or more and 1 µm or less. For example, when the thickness of the internal electrode layer 12 is 1 µm or less, the continuity modulus of the internal electrode layer 12 tends to get smaller because of breaking during the firing. Therefore, when the thickness of the internal electrode layer 12 is 1 µm or less, the effect of the structure of the embodiment becomes remarkable. In the multilayer ceramic capacitor 100, the stack number of the internal electrode layers 12 is, for example, 10 to 5000, 50 to 4000, or 100 to 3000.

When the Sn concentration of the internal electrode layer 12 is excessively large, the ESR of the multilayer ceramic capacitor 100 may get larger. Alternatively, the internal electrode layer 12 may be melt during the firing. Accordingly, it is preferable that the Sn concentration has an upper limit. For example, it is preferable that the Sn concentration of the internal electrode layer 12 is 10 at % or less. It is more preferable that the Sn concentration of the internal electrode layer 12 is 5 at % or less. It is still more preferable that the Sn concentration of the internal electrode layer 12 is 1 at % or less. The "at %" of Sn is an atomic concentration ratio of Sn on a presumption that the total amount of Ni and Sn is 100 at %.

On the other hand, when the Sn concentration of the internal electrode layer 12 is excessively small, the multilayer ceramic capacitor 100 may not necessarily have sufficient resistance to humidity. Accordingly, it is preferable that the Sn concentration has a lower limit. For example, it is preferable that the Sn concentration of the internal electrode layer 12 is 0.01 at % or more. It is more preferable that the Sn concentration of the internal electrode layer 12 is 0.05 at % or more. It is still more preferable that the Sn concentration of the internal electrode layer 12 is 0.1 at % or more.

For example, it is preferable that a ratio of the maximum value of the Sn concentration of the internal electrode layers 12 with respect to the minimum value of the Sn concentration is more than 1 and 1000 or less. It is more preferable that the ratio is 1.5 or more and 100 or less. It is still more preferable that the ratio is 2 or more and 50 or less.

Figure 6:
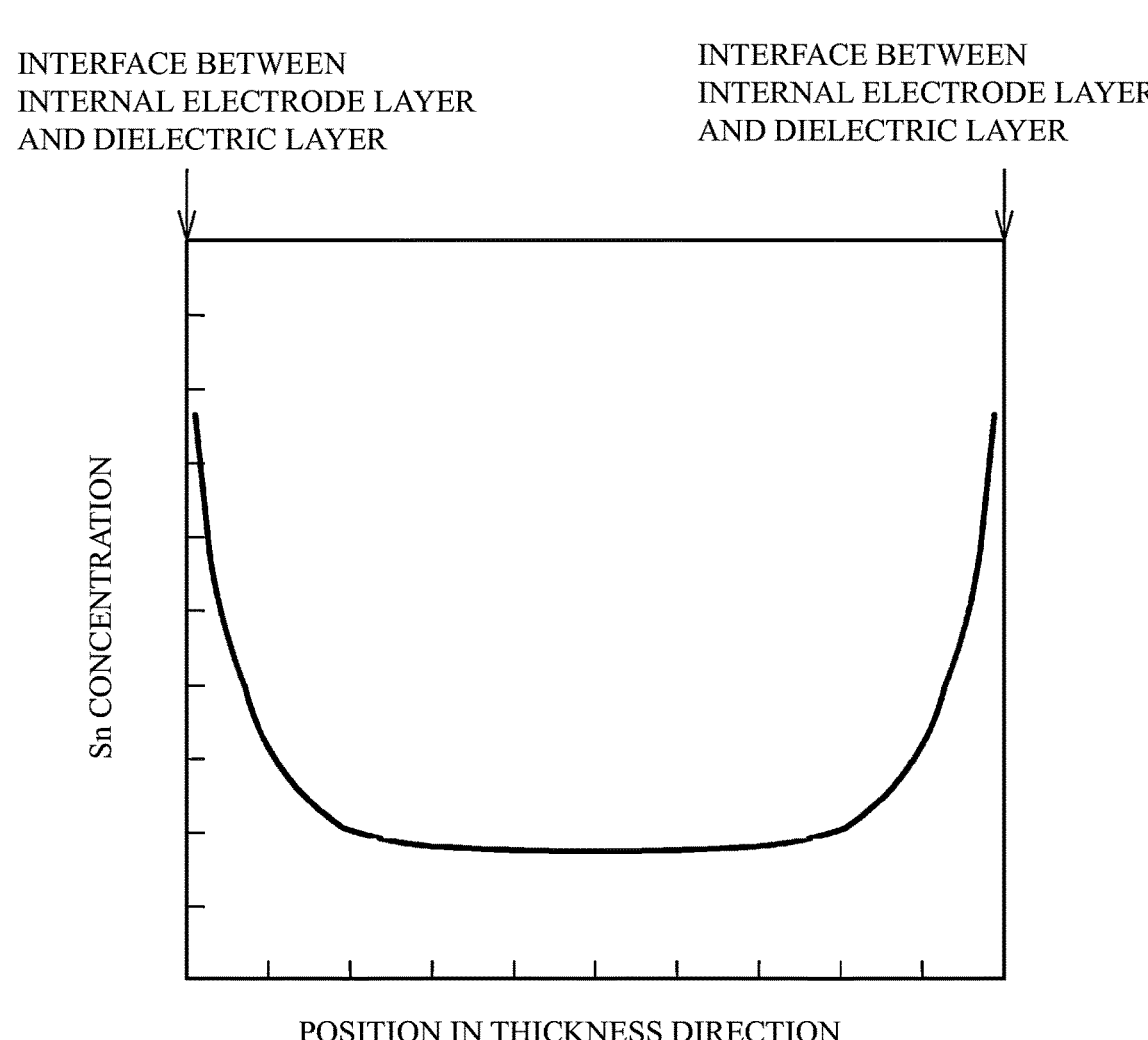
FIG. 6 illustrates a Sn concentration in an internal electrode layer.

It is preferable that the Sn concentration is relatively high in the vicinity of the interface between the internal electrode layer 12 and the dielectric layer 11. This is because the whole of the internal electrode layer does not have influence on the reliability but only the interface has a large effect on the reliability. Accordingly, as illustrated in FIG. 6, it is preferable that the internal electrode layer 12 has a concentration gradient in which the Sn concentration is relatively low in the center portion in the thickness direction of the internal electrode layer 12, and the Sn concentration is relatively high in the vicinity of the interface between the internal electrode layer 12 and the dielectric layer 11.

In the embodiment, the internal electrode layers 12 include Sn, in addition to Ni. In this case, the mechanical strength of the internal electrode layers 12 gets greater. When all of the internal electrode layers 12 include Sn in addition to Ni, the mechanical strength of the multilayer ceramic capacitor 100 is improved.

Figure 7:
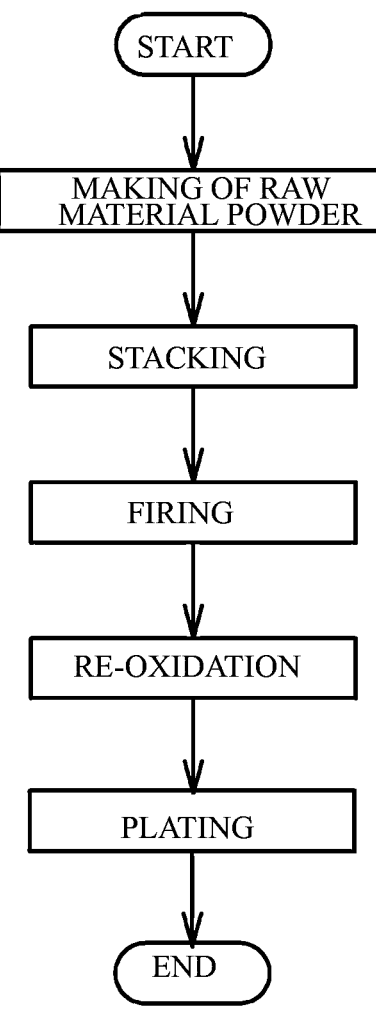
FIG. 7 illustrates a manufacturing method of a multilayer ceramic capacitor.

Next, a description will be given of a manufacturing method of the multilayer ceramic capacitor 100. FIG. 7 illustrates a manufacturing method of the multilayer ceramic capacitor 100.

(Making process of raw material powder) A dielectric material for forming the dielectric layer 11 is prepared. The dielectric material includes the main component ceramic of the dielectric layer 11. Generally, an A site element and a B site element are included in the dielectric layer 11 in a sintered phase of grains of $ABO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of the ceramic structuring the dielectric layer 11. For example, a solid-phase method, a sol-gel method, a hydrothermal method or the like can be used. The embodiment may use any of these methods.

An additive compound may be added to the resulting ceramic powder, in accordance with purposes. The additive compound may be an oxide of Mg (magnesium), Mn (manganese), V (vanadium), Cr (chromium) or a rare earth element (Y (yttrium), Sm (samarium), Eu (europium), Gd (gadolinium), Tb (terbium), Dy (dysprosium), Ho (holmium), Er (erbium), Tm (thulium) and Yb (ytterbium)), or an oxide of Co (cobalt), Ni (nickel), Li (lithium), B (boron), Na (sodium), K (potassium) and Si (silicon). The additive compound may be a glass including cobalt, nickel, lithium, boron, sodium, potassium or silicon.

For example, the resulting ceramic raw material powder is wet-blended with additives and is dried and crushed. Thus, a ceramic material is obtained. For example, the grain diameter may be adjusted by crushing the resulting ceramic material as needed. Alternatively, the grain diameter of the resulting ceramic power may be adjusted by combining the crushing and classifying. With the processes, a dielectric material is obtained.

(Stacking process) Next, a binder such as polyvinyl butyral (PVB) resin, an organic solvent such as ethanol or toluene, and a plasticizer are added to the resulting dielectric material and wet-blended. With use of the resulting slurry, a dielectric green sheet 52 is painted on a base material 51 by, for example, a die coater method or a doctor blade method, and then dried. The base material 51 is, for example, PET (polyethylene terephthalate) film.

Figure 8A:
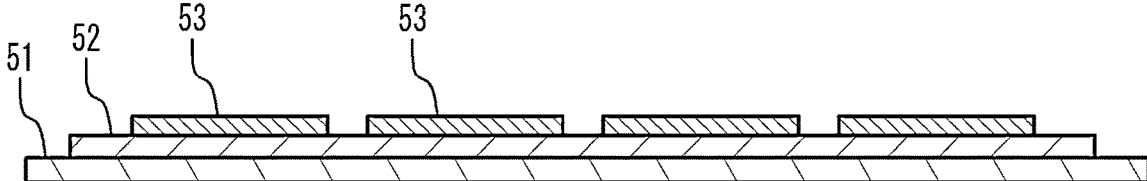
FIG. 8A and FIG. 8B illustrate a stacking process.

Next, as illustrated in FIG. 8A, an internal electrode pattern 53 is formed on the dielectric green sheet 52. In FIG. 8A, as an example, four parts of the internal electrode pattern 53 are formed on the dielectric green sheet 52 and are spaced from each other. The forming method is not limited. For example, electrode paste including Ni—Sn alloy powder or a mixture of Ni powder and Sn powder may be used. A vacuum deposition method such as a sputtering method using a Nu-Sn alloy target may be performed. A simultaneous sputtering using individual targets of Ni and Sn may be performed. The dielectric green sheet 52 on which the internal electrode pattern 53 is formed is a stack unit.

Figure 8B:
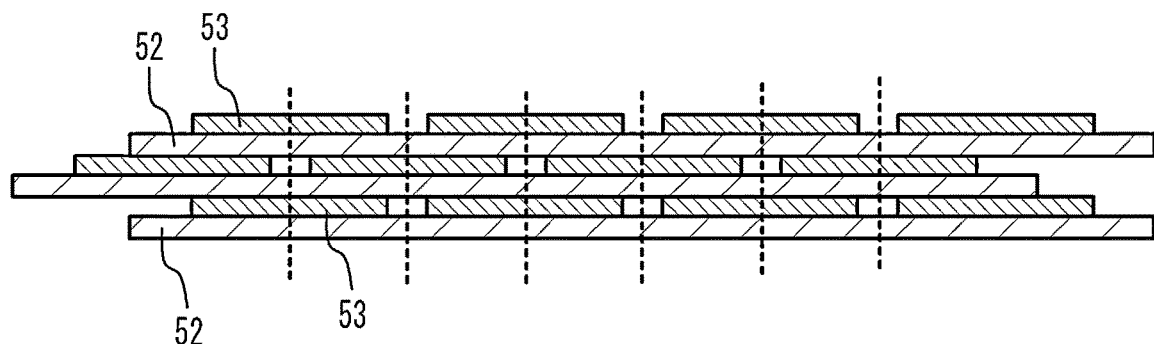

Next, the dielectric green sheets 52 are peeled from the base materials 51. As illustrated in FIG. 8B, three or more of the stack units are stacked. In this case, the Sn concentration of the internal electrode pattern on the edge side is higher than the Sn concentration of the internal electrode pattern on the center side in the stacking direction, in at least two of the internal electrode patterns. The Sn concentration each internal electrode pattern may be adjusted so that the distribution of the Sn concentration of FIG. 4A to FIG. 5.

A predetermined number (for example, 2 to 10) of a cover sheet is stacked on an upper face and a lower face of a ceramic multilayer structure of the stacked stack units and is thermally clamped. The resulting ceramic multilayer structure is cut into a chip having a predetermined size (for example, 1.0 mm×0.5 mm). In FIG. 8B, the multilayer structure is cut along a dotted line. The components of the cover sheet may be the same as those of the dielectric green sheet 52. Additives of the cover sheet may be different from those of the dielectric green sheet 52.

(Firing process) The binder is removed from the ceramic multilayer structure in $N_2$ atmosphere. Metal paste to be the base layers of the external electrodes 20a and 20b is applied to the ceramic multilayer structure by a dipping method. The resulting ceramic multilayer structure is fired for 10 minutes to 2 hours in a reductive atmosphere having an oxygen partial pressure of $10^{-5}$ to $10^{-8}$ atm in a temperature range of 1100 degrees C. to 1300 degrees C. In this manner, it is possible to manufacture the multilayer ceramic capacitor 100.

(Re-oxidizing process) After that, a re-oxidizing process may be performed in $N_2$ gas atmosphere in a temperature range of 600 degrees C. to 1000 degrees C.

(Plating process) After that, by a plating method, metal layers such as Cu, Ni, Sn or the like may be plated on the external electrodes 20a and 20b.

In the manufacturing method of the embodiment, the internal electrode layer 12 having a larger Sn concentration is closer to the outermost edge in the stacking direction than the internal electrode layer 12 having a smaller Sn concentration, in a relationship of at least two of the internal electrode layers 12 within a range from the center internal electrode layer 12 in the stacking direction to the outermost internal electrode layer 12 in the stacking direction. It is therefore possible to reduce the ESR and improve the resistance to humidity of the multilayer ceramic capacitor 100.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

EXAMPLES

The multilayer ceramic capacitors in accordance with the embodiment were made and the property was measured.

(Example 1) An additive was added to barium titanate powder. The additive and the barium titanate powder were sufficiently wet-blended and crushed in a ball mill. Thus, a dielectric material was made. Butyral-based material acting as an organic binder, and toluene and ethanol acting as a solvent were added to the dielectric material. And, the dielectric green sheet was made on a base material of PET by a doctor blade method. The thickness of the dielectric green sheet was 1.0 μm.

Next, an internal electrode pattern was formed on the dielectric green sheet by using paste including a Ni—Sn alloy.

Next, the dielectric green sheet was peeled from the base material. A plurality of the stack units were stacked. The number of the stack units was 1000. Next, a predetermined number of a cover sheet was stacked on an upper face and a lower face of the ceramic multilayer structure of the stacked stack units and was thermally clamped. After that, the resulting ceramic multilayer structure was cut into a chip having a predetermined size (1.0 mm×0.5 mm×0.5 mm).

The binder was removed from the ceramic multilayer structure in $N_2$ atmosphere. Metal paste to be the base layers of the external electrodes was applied to the ceramic multilayer structure by a dipping method. The ceramic multilayer structure was fired in a reductive atmosphere.

The thickness of the internal electrode layers 12 after the firing was 0.5 μm. The Sn concentration of the internal electrode layers 12 in the outer section of 20 μm from the outermost of the multilayer chip 10 in the stacking direction calculated from the frequency characteristic of the impedance. Table 1 shows the results. Table 1 also shows a ratio of the Sn concentration of the outer layer section and the Sn concentration of the center section.

TABLE 1

| | Sn CONCENTRATION OF OUTER LAYER SECTION (at %) | Sn CONCENTRATION OF CENTER SECTION (at %) | CONCENTRATION RATIO OF OUTER LAYER/CENTER | LIFETIME IN MOISTURE AND LOAD (min) | ESR (mΩ) | TRANSVERSE STRENGTH (N) |
|---|---|---|---|---|---|---|
| EXAMPLE 1 | 3 | 0.2 | 15 | 5000 | 12 | 12 |
| EXAMPLE 2 | 3 | 0.05 | 60 | 5000 | 11 | 12 |
| EXAMPLE 3 | 10 | 0.1 | 50 | 6000 | 13 | 16 |
| COMPARATIVE EXAMPLE 1 | 0 | 0 | — | 1000 | 10 | 10 |
| COMPARATIVE EXAMPLE 2 | 3 | 3 | 1 | 5000 | 15 | 12 |
| COMPARATIVE EXAMPLE 3 | 0.2 | 3 | 0.07 | 1000 | 10 | 11 | was 3 at %. The number of the internal electrode layers 12 in the outer section was 9. The Sn concentration of the internal electrode layers 12 in the center section other than the outer section was 0.2 at %.

(Example 2) In an example 2, the Sn concentration of the internal electrode layers 12 in the center section other than the outer layer sections of 10 μm from the outermost edges in the stacking direction in the multilayer chip 10 was 0.05 at %. Other conditions were the same as those of the example 1.

(Example 3) In an example 3, the Sn concentration of the internal electrode layers 12 in the outer layer sections of 10 μm from the outermost edges in the stacking direction in the multilayer chip 10 was 10 at %. The Sn concentration of the internal electrode layers 12 in the center section other than the outer layer sections was 0.1 at %. Other conditions were the same as those of the example 1.

(Comparative example 1) In a comparative example 1, Sn was not added to any of the internal electrode layers 12. Other conditions were the same as those of the example 1.

(Comparative example 2) In a comparative example 2, the Sn concentration of the internal electrode layers 12 in the outer layer sections of 10 μm from the outermost edges in the stacking direction in the multilayer chip 10 was 3 at %. The Sn concentration of the internal electrode layers 12 in the center section other than the outer layer sections was 3 at %. Other conditions were the same as those of the example 1.

(Comparative example 3) In a comparative example 3, the Sn concentration of the internal electrode layers 12 in the outer layer sections of 10 μm from the outermost edges of the stacking direction in the multilayer chip 10 was 0.2 at %. The Sn concentration of the internal electrode layers 12 of the center section other than the outer sections was 3 at %. Other conditions were the same as those of the example 1.

(Analysis) With respect to each of the examples 1 to 3 and the comparative examples 1 to 3, a lifetime (min) in a moisture and load, a transverse strength (N), and an ESR (mΩ) were measured. The lifetime in a moisture and load was measured at a temperature of 85 degrees C. and a humidity of 85%. A bridge was located between the both edges of the samples. Each of center portions of the samples was pressed by a blade having a predetermined edge diameter. A load at which a sample was broken down was measured as the transverse strength (N). The ESR was When the lifetime in a moisture and a load of a sample was more than 1000 min, the sample was determined as good. When the ESR of a sample was less than 15 mΩ, the sample was determined as good. The lifetime in a moisture and a load, and the ESR of the examples 1 to 3 were determined as good. It is thought that this was because the Sn concentration of the internal electrode layers having a small distance from the external environment was large, and the Sn concentration of the internal electrode layers having a large distance from the external environment was small. The transverse strength of the examples 1 to 3 were large. It is thought that this was because Sn together with Ni were added to the internal electrode layers, and the mechanical strength was improved.

The lifetime in a moisture and a load of the comparative example 1 was determined as bad. It is thought that this was because Sn was not added to the internal electrode layers, and sufficient resistance to humidity was not achieved.

The ESR of the comparative example 2 was determined as bad. It is thought that this was because the Sn concentration of the internal electrode layers having a large distance from the external environment was large.

The lifetime in a moisture and a load of the comparative example 3 was determined as bad. It is thought that this was because the Sn concentration of the internal electrode layers having a small distance from the external environment was small, and sufficient resistance to humidity was not achieved.

(Example 4) In an example 4, the Sn concentration of the outermost internal electrode layers in the stacking direction was 3 at %. The Sn concentration of a center internal electrode layer in the stacking direction was 0.2 at %. The Sn concentration got larger from the center to the outermost in the stacking direction in steps. In concrete, the Sn concentration got larger in steps of each 10 internal electrode layers from the center toward outermost in the stacking direction. The number of the steps of the Sn concentration was 50. The lifetime (min) in a moisture and a load, the transverse strength (N), and the ESR (mΩ) of the example 4 were measured. Table 2 shows the result. As shown in Table 2, the lifetime in a moisture and a load, and the ESR were determined as good. It is thought that this was because the Sn concentration of the internal electrode layers having a small distance from the external environment was large, and the Sn concentration of the internal electrode layers having a large distance from the external environment was small. Large transverse strength was achieved. It is thought that this was because Sn together with Ni were added to the internal electrode layers, and the mechanical strength was improved.

TABLE 2

| | Sn CONCENTRATION OF OUTERMOST LAYER (at %) | Sn CONCENTRATION OF CENTER (at %) | LIFETIME IN MOISTURE AND LOAD (min) | ESR (mΩ) | TRANSVERSE STRENGTH (N) |
|---|---|---|---|---|---|
| EXAMPLE 4 | 3 | 0.2 | 5500 | 13 | 13 |

Although the embodiments of the present invention have been described in detail, it is to be understood that the various change, substitutions, and alterations could be made hereto without departing from the spirit and scope of the invention.

The invention claimed is:

1. A ceramic electronic device comprising:
a multilayer structure in which each of a plurality of dielectric layers of which a main component is ceramic and each of three or more of internal electrode layers are alternately stacked,
wherein the three or more of internal electrode layers include Ni and Sn, wherein Sn is distributed entirely in the three or more of internal electrode layers, and
an internal electrode layer having a larger Sn concentration is closer to an outermost edge in a stacking direction than an internal electrode layer having a smaller Sn concentration and being located on a center side of the stacking direction, in a relationship of at least two of the three or more of internal electrode layers.

2. The ceramic electronic device as claimed in claim 1, wherein a Sn concentration of an outermost one of the plurality of internal electrode layers is the highest, in a part of the plurality of internal electrode layers from a center one of the plurality of internal electrode layers to an outermost one of the plurality of internal electrode layers.

3. The ceramic electronic device as claimed in claim 1, wherein a Sn concentration of internal electrode layers from an outermost edge to a center side in the stacking direction is higher than a Sn concentration of remaining internal electrode layers on the center side of the stacking direction.

4. The ceramic electronic device as claimed in claim 1, wherein a Sn concentration of internal electrode layers from a center internal electrode layer to an outermost internal electrode layer in the stacking direction gradually gets larger or gets larger in steps from the center internal electrode layer to the outermost internal electrode layer in the stacking direction.

5. The ceramic electronic device as claimed in claim 1, wherein each thickness of the three or more of internal electrode layers is 1 μm or less.

6. The ceramic electronic device as claimed in claim 1, wherein the Sn concentration of the three or more of internal electrode layers is 10 at % or less.

7. The ceramic electronic device as claimed in claim 1, wherein the Sn concentration of the three or more of internal electrode layers is 0.1 at % or more.

8. The ceramic electronic device as claimed in claim 1, wherein a ratio of a maximum Sn concentration with respect to a minimum Sn concentration is more than 1 and 100 or less, in the three or more of internal electrode layers.

9. The ceramic electronic device as claimed in claim 1, wherein a Sn concentration near each interface between the plurality of internal electrode layers and the plurality of dielectric layers in the plurality of internal electrode layers is higher than that of a center portion of the plurality of internal electrode layers in a thickness direction.

10. A ceramic electronic device comprising:
a multilayer structure in which each of a plurality of dielectric layers of which a main component is ceramic and each of three or more of internal electrode layers are alternately stacked,
wherein the three or more of internal electrode layers include Ni and Sn, wherein each internal electrode layer has a Sn concentration gradient in a thickness direction, and
an internal electrode layer having a larger Sn concentration is closer to an outermost edge in a stacking direction than an internal electrode layer having a smaller Sn concentration and being located on a center side of the stacking direction, in a relationship of at least two of the three or more of internal electrode layers.

11. The ceramic electronic device as claimed in claim 10, wherein the three or more of internal electrode layers has the Sn concentration gradient in a thickness direction thereof.

12. The ceramic electronic device as claimed in claim 11, wherein, in each of the three or more of internal electrode layers, the Sn concentration is smaller in a center portion in the thickness direction, and the Sn concentration is higher in a vicinity of an interface with a dielectric layer next to the each of the three or more of internal electrode layers.

*    *    *    *    *